UNITED STATES PATENT OFFICE.

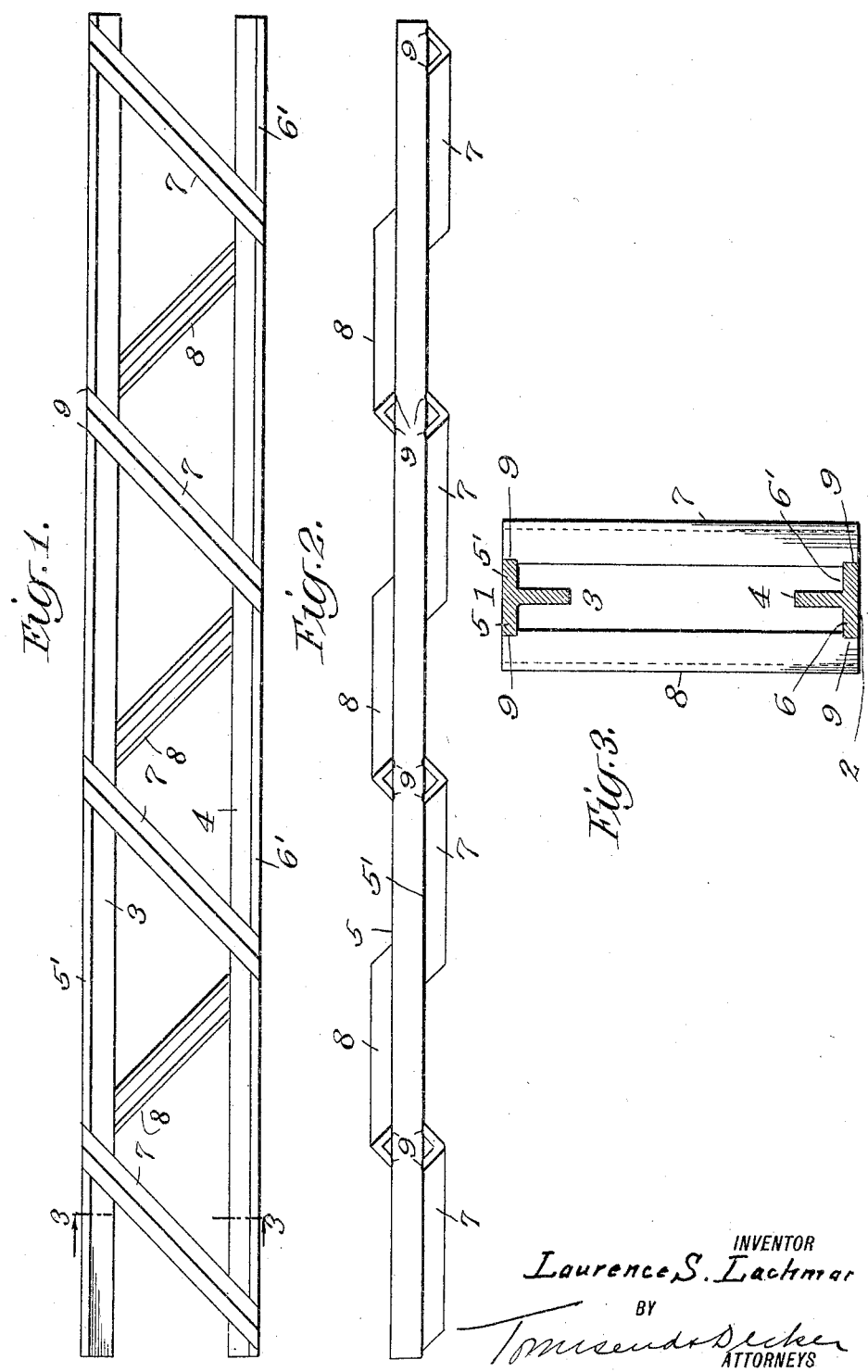

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

GIRDER OR FRAME.

1,419,274.  Specification of Letters Patent.  Patented June 13, 1922.

Application filed May 8, 1916. Serial No. 96,020.

*To all whom it may concern:*

Be it known that I, LAURENCE S. LACHMAN, a citizen of the United States, and a resident of New York, in the county of New York and State of New York, have invented certain new and useful Improvements in Girders or Frames, of which the following is a specification.

My present invention relates to the construction of metallic structures such as girders, frames and the like, for use per se or as reinforcement for concrete.

The object of the invention is to provide a light, strong construction for the above purposes and which when used as a reinforcement will make a very effective bond with the concrete.

Preferably standard shapes of material are utilized thereby lowering the cost and avoiding the expense and difficulty of obtaining special shapes. Also by this invention considerable depth or thickness of structure is attained without multiplying parts or utilizing large, heavy material thus increasing the strength of frames or girders of this type.

The invention consists in the improved girder or frame construction hereinafter more particularly described and then specified in the claim.

In the accompanying drawings, Fig. 1 is a side elevation of a metallic structure such as a section of girder or frame constructed in accordance with this invention.

Fig. 2 is a plan view of the same.

Fig. 3 is a vertical transverse cross-section taken on the line 3—3 Fig. 1.

In the drawings, 1 and 2 indicates the upper and lower longitudinal members of a girder. The said members are arranged parallel with each other in the same vertical plane and are flanged metal bars preferably T-shaped in cross-section. The central flanges or the webs 3 and 4 of each of the members respectively project toward each other while the oppositely projecting top flanges 5, 5′ of the member 1 and 6, 6′ of the member 2 constitute the upper and lower edge of the girder or frame. The width from one edge to the other of the flanges 5, 5′ and 6, 6′ may be of any desired dimension and determines the main depth or thickness of the frame.

7 indicates a series of angle or V-shaped bars diagonally disposed on one side of the members 1 and 2 while 8 indicates a similar series of angle or V-shaped bars disposed on the other side of the members 1 and 2 and diagonally arranged in the opposite direction to the bars 7 to complete the truss structure.

The angle or V-shaped bars 7 and 8 each engage and intersect the edge of the flanges of the members 1 and 2 by their free edges and at such points of engagement the parts are welded together preferably by the electric welding process. The action and manner of utilizing this process for uniting metal is now so well known that any detailed description is deemed unnecessary herein. The result is the formation of a welded union at each of the points of intersection indicated at 9.

The bars 7 and 8 are brought together into engagement with the flanges of the members 1 and 2 preferably in such manner that the ends of the bars 7 engage the flanges of the members 1 and 2 opposite the ends of the bars 8 whereby the welding of two bars may be effected at one time and the result is a connection of all the bars 7 and 8 on both sides of the members 1 and 2 to form a continuous truss structure, the total width of which is from the apex of the bars 7 on one side to the apex of the bars 8 on the other side.

It will be understood that the invention is not limited to the exact construction or arrangement shown or described except as may be specified in the appended claim.

What I claim as my invention is:—

A girder comprising T-shaped longitudinal members, a series of parallel diagonal members on one side of said longitudinal members and a series of parallel diagonal members oppositely arranged on the other side of said longitudinal members, the ends of the bars of one series of diagonal members engaging the edge of the oppositely projecting flanges of the T members opposite the ends of the bars of the other series and electric welds joining said members at such points of engagement.

Signed at New York, in the county of New York and State of New York, this 17th day of January A. D. 1916.

LAURENCE S. LACHMAN.

Witnesses:
  F. B. TOWNSEND,
  IRENE LEFKOWITZ.